(12) United States Patent
Persson et al.

(10) Patent No.: US 7,801,046 B2
(45) Date of Patent: Sep. 21, 2010

(54) METHOD AND SYSTEM FOR BANDWIDTH CONTROL ON A NETWORK INTERFACE CARD

(75) Inventors: Anders D. Persson, San Mateo, CA (US); Cesar A. C. Marcondes, Londrina (BR); Darrin P. Johnson, San Jose, CA (US); Kais Belgaied, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 156 days.

(21) Appl. No.: 12/111,022

(22) Filed: Apr. 28, 2008

(65) Prior Publication Data

US 2009/0268611 A1 Oct. 29, 2009

(51) Int. Cl.
   *H04J 3/14* (2006.01)
(52) U.S. Cl. .................. 370/235; 370/229; 370/230; 370/231
(58) Field of Classification Search .......... 370/229–240
   See application file for complete search history.

(56) References Cited

U.S. PATENT DOCUMENTS

| | | | | |
|---|---|---|---|---|
| 4,849,968 | A | * | 7/1989 | Turner .................. 370/232 |
| 5,751,951 | A | * | 5/1998 | Osborne et al. .......... 709/250 |
| 5,797,039 | A | * | 8/1998 | Cochavy .................. 710/52 |
| 5,892,980 | A | * | 4/1999 | Tal et al. ................. 710/56 |
| 5,936,958 | A | * | 8/1999 | Soumiya et al. ........ 370/395.43 |
| 5,995,486 | A | * | 11/1999 | Iliadis .................... 370/229 |
| 6,041,053 | A | | 3/2000 | Douceur et al. |
| 6,070,219 | A | | 5/2000 | McAlpine et al. |
| 6,115,779 | A | * | 9/2000 | Haubursin et al. ......... 710/262 |
| 6,163,539 | A | | 12/2000 | Alexander et al. |
| 6,477,643 | B1 | | 11/2002 | Vorbach et al. |
| 6,600,721 | B2 | | 7/2003 | Edholm |
| 6,714,960 | B1 | | 3/2004 | Bitar et al. |
| 6,757,731 | B1 | | 6/2004 | Barnes et al. |
| 6,831,893 | B1 | | 12/2004 | Ben Nun et al. |
| 6,859,435 | B1 | * | 2/2005 | Lee et al. ................ 370/231 |
| 6,859,841 | B2 | | 2/2005 | Narad et al. |
| 6,944,168 | B2 | | 9/2005 | Paatela et al. |
| 7,046,665 | B1 | | 5/2006 | Walrand et al. |
| 7,177,311 | B1 | | 2/2007 | Hussain et al. |
| 7,260,102 | B2 | | 8/2007 | Mehrvar et al. |
| 7,313,142 | B2 | | 12/2007 | Matsuo et al. |
| 2003/0037154 | A1 | | 2/2003 | Poggio et al. |

(Continued)

OTHER PUBLICATIONS

Tripathi, S.; "Crossbow Architectural Document"; Nov. 21, 2006; 19 pages.

(Continued)

*Primary Examiner*—William Trost, IV
*Assistant Examiner*—Ashil Farahmand
(74) *Attorney, Agent, or Firm*—Osha • Liang LLP

(57) ABSTRACT

A method for bandwidth control on a network interface card (NIC), the method that includes initiating a current time period, receiving a plurality of incoming packets for a receive ring, populating, by a NIC, the receive ring with the plurality of incoming packets according to a size of the receive ring during the current time period, wherein the size of the receive ring is based on an allocated bandwidth for the receive ring, and sending, by the NIC, the plurality of incoming packets to a host when a duration of the current time period elapses, wherein the duration is based on the allocated bandwidth for the receive ring.

16 Claims, 10 Drawing Sheets

U.S. PATENT DOCUMENTS

| | | |
|---|---|---|
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0075119 A1* | 4/2006 | Hussain et al. .............. 709/227 |
| 2006/0174324 A1 | 8/2006 | Zur et al. |
| 2008/0144633 A1* | 6/2008 | Woloszynski et al. .. 370/395.31 |

OTHER PUBLICATIONS

Nordmark, E.; "IP Instances—Network Virtualization Meets Zones"; presented at SVOSUG, Oct. 26, 2006; 28 pages.

Tripathi, S.; "Crossbow: Network Virtualization and Resource Control"; presented at SVOSUG, Aug. 24, 2006; 27 pages.

Tripathi, S.; "Crossbow:Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; 22 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

| | Current Time Unit 300 | Packets Received 302 | State of Receive Ring 304 | Interrupt Sent 306 |
|---|---|---|---|---|
| 308 → | Time Unit 0 | | | |
| 310 → | Time Unit 1 | A | A | |
| 312 → | Time Unit 2 | B | A, B | |
| 314 → | Time Unit 3 | C | A, B, C | |
| 316 → | Time Unit 4 | D, E | A, B, C, D, E | Send Interrupt |
| 318 → | Time Unit 5 | F, G | F, G | |
| 320 → | Time Unit 6 | H, I | F, G, H, I | |
| 322 → | Time Unit 7 | J | F, G, H, I, J | Send Interrupt |
| 324 → | Time Unit 8 | K, L, M, N, O | K, L, M, N, O | |
| 326 → | Time Unit 9 | P, Q, R, S | K, L, M, N, O | |

*Figure 6*

METHOD AND SYSTEM FOR BANDWIDTH CONTROL ON A NETWORK INTERFACE CARD

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,122; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926 ; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; "Shared and Separate Network Stack Instances" with U.S. application Ser. No. 11/489,933; and; "Multiple Virtual Network Stack Instances using Virtual Network Interface Cards" with U.S. application Ser. No. 11/489,942.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine a the connection associated with the packet.

Typically, the classifier includes a connection data structure that includes information about active connections on the receiving system. The connection data structure may include the following information about each active connection: (i)

the queue associated with the connection; and (ii) information necessary to process the packets on the queue associated with the connection.

Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places teem in the appropriate queue. Once packets are placed in the queue, those packets are processed through various layers of the network stack. When the packet reaches the application layer of the network stack, the operating system of the receiving system may determine whether the bandwidth allocated to the application corresponding to the appropriate queue permits an additional packet. If the bandwidth does not permit the additional packet, then the packet is dropped.

SUMMARY

In general, in one aspect, the invention relates to a method for bandwidth control on a network interface card (NIC), the method that includes initiating a current time period, receiving a plurality of incoming packets for a receive ring, populating, by a NIC, the receive ring with the plurality of incoming packets according to a size of the receive ring during the current time period, wherein the size of the receive ring is based on an allocated bandwidth for the receive ring, and sending, by the NIC, the plurality of incoming packets to a host when a duration of the current time period elapses, wherein the duration is based on the allocated bandwidth for the receive ring.

In general, in one aspect, the invention relates to a method for bandwidth control on a network interface card (NIC), the method that includes determining whether an expected dispersion duration has elapsed since a last interrupt time, wherein the expected dispersion duration is based on an allocated bandwidth for a receive ring, identifying a subset of a plurality of packets in the receive ring, wherein the number of packets in the subset is based on the allocated bandwidth for the receive ring, associating the subset with an available identifier when the expected dispersion duration has elapsed, and sending, by the NIC, the subset to a host based on the available identifier.

In general, in one aspect, the invention relates to a network interface card, that includes a receive ring and a receive regulation engine. The receive regulation is configured to initiate a current time period, receive a plurality of incoming packets for the receive ring, populate the receive ring with the plurality of incoming packets according to a size of the receive ring during the current time period, wherein the size of the receive ring is based on an allocated bandwidth for the receive ring, and send the plurality of incoming packets to a host when a duration of the current time period elapses, wherein the duration is based on the allocated bandwidth for the receive ring.

Other aspects of the invention will be apparent from the following description and the appended claims.

BRIEF DESCRIPTION OF DRAWINGS

FIG. 6 shows an example timing chart for bandwidth control for receiving packets in accordance with one or more embodiments of the invention.

DETAILED DESCRIPTION

Figure 1:
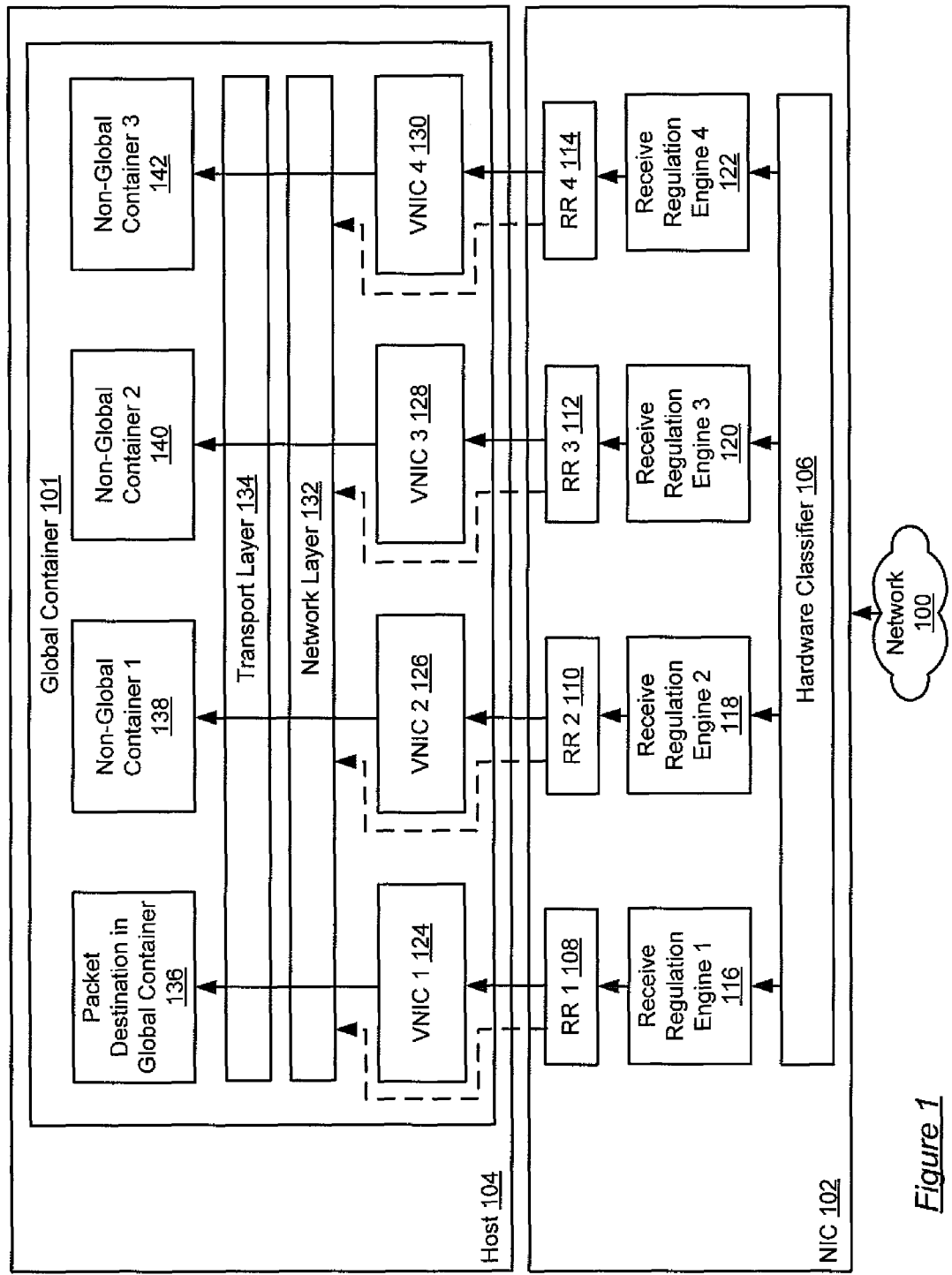
FIGS. 1 and 2 show a system for bandwidth control in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for performing bandwidth control on a network interface card (NIC). The NIC is a piece of hardware found in a typical computer system that includes functionality to send and receive network traffic. In one or more embodiments of the invention, the NIC is attached to multiple virtual network stack (VNS) instances on a single host. The host includes at least one virtual network interface card (VNIC) for each VNS instance. Each VNS instance may have different allocated bandwidths in accordance with one or more embodiments of the invention.

Bandwidth control manages the frequency at which incoming packets and/or outbound packets are sent or received for each VNS instance. Bandwidth control limits the number of incoming packets (i.e., packets received from the network) or outbound packets (i.e., packets sent on the network) that may be sent or received for a VNS instance over a certain period as measured in units of time (e.g., second(s), millisecond(s), microsecond(s), etc.).

In one or more embodiments of the invention, the bandwidth control is managed using a receive ring (discussed below) and/or a transmit ring (discussed below) on the NIC and associated with the VNS instance. In one or more embodiments of the invention, the bandwidth control may be performed by adjusting the size of the receive ring or transmit ring for the specific VNS instance, or by delaying the packets on the receive ring according to the allocated bandwidth.

Figure 2:
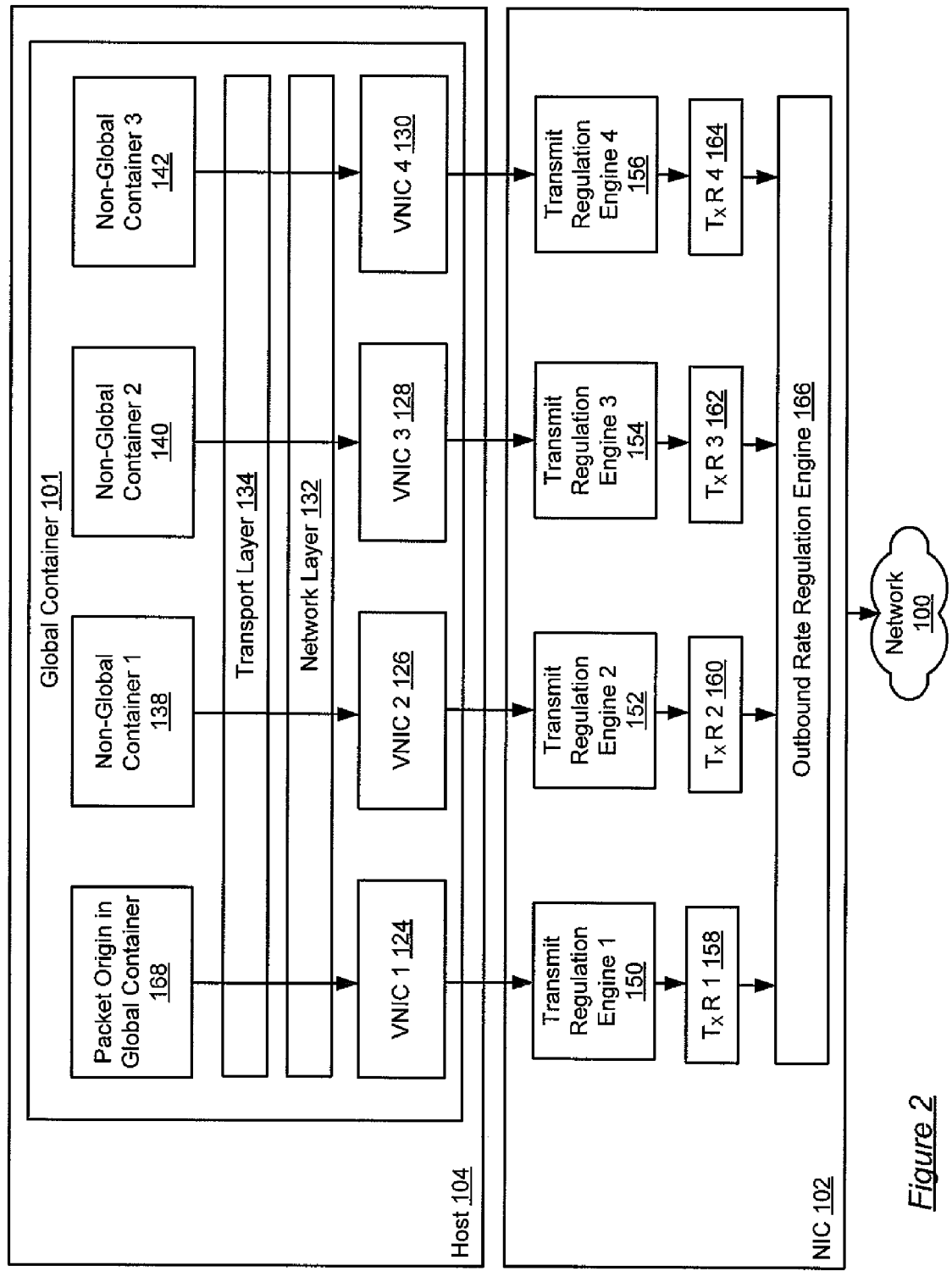

FIGS. 1 and 2 show a system for bandwidth control in accordance with one or more embodiments of the invention.

In particular, FIG. 1 shows a system for performing bandwidth control for incoming packets (i.e., packets received from a network (100) (e.g., the Internet, a wide area network (WAN), a local area network (LAN), etc.)). The system shown in FIG. 1 includes a host (104) and a network interface card (NIC) (102). The NIC (102) includes a hardware classifier (106), a number of receive rings (RRs) (108, 110, 112, 114), and receive regulation engines (116, 118, 120, 122).

The NIC (102) is configured to send and receive packets. The hardware classifier (106) is configured classify incoming packets. In one or more embodiments of the invention, the hardware classifier (106) classifies an incoming packet based on information in the header of incoming packet. Accordingly, the hardware classifier (106) may classify the incoming packet based on one or a combination of the following: the source internet protocol (IP) address, the destination IP address, a source Media Access Control (MAC) address, a destination MAC address, a source port, a destination port, a protocol type (e.g., Transmission Control Protocol (TCP), User Datagram Protocol (UDP), etc.). The hardware classifier (106) is not limited to classifying an incoming packet based on one of the aforementioned parameters.

Continuing with the discussion of FIG. 1, once an incoming packet has been classified, the incoming packet is sent to the appropriate RR (108, 110, 112, 114). Typically, each RR (108, 110, 112, 114) is configured to receive incoming packets for a specific non-global container (138, 140, 142) or a particular packet destination in the global container (136). In one embodiment of the invention, each RR (108, 110, 112, 114) corresponds to a buffer in the NIC (102), which is configured to store a finite number of incoming packets.

In one or more embodiments of the invention, receive regulation engines (116, 118, 120, 122) are interposed between the RR (108, 110, 112, 114) and the hardware classifier (106). The receive regulation engines (116, 118, 120, 122) may correspond to firmware on the NIC that includes functionality to perform bandwidth control for a specific RR (e.g., 108, 110, 112, 114). In one or more embodiments of the invention, the receive regulation engines (116, 118, 120, 122) include functionality to receive bandwidth parameters for a receive ring (108, 110, 112, 114) and adjust the bandwidth according to the bandwidth parameters.

In one or more embodiments of the invention, the bandwidth parameter may be specified for both incoming packets and outbound packets (discussed in FIG. 2). In one or more embodiments of the invention, the bandwidth parameters for incoming packets may specify one or more of the following: a size of the receive ring, an identifier of the receive ring, the allocated bandwidth for the receive ring, a time period with a specified number of incoming packets allowed during the time period, a number of interrupts allocated in the time period, a threshold number of incoming packets to receive before issuing an interrupt, and an expected dispersion duration. Each of these bandwidth parameters are discussed below.

In one or more embodiments of the invention, the size of the receive ring (108, 110, 112, 114) is the number of descriptors allocated to the receive ring. A descriptor is a unique identifier (and, optionally, associated data structure such as a pointer) assigned to an incoming packet. In one or more embodiments of the invention, the receive ring identifier may be a VNS instance identifier (discussed below), a VNIC identifier, or any other unique identifier that may be used to identify the receive ring from other receive rings on the NIC.

In one or more embodiments of the invention, a time period is a duration of time in which only a preset number of interrupts may be sent to the host.

Specifically, in the time period, an interrupt is sent to the host during a current time period when the threshold number of packets is received and if an interrupt is remaining (i.e., the preset number of interrupts is not exceeded). At the end of the current time period, an interrupt is sent to the host if at least one packet is in the receive ring and a new time period is started. Thus, the size of the receive ring, the preset number of interrupts, and the duration of time in the time period may be used to perform bandwidth control.

In one or more embodiments of the invention, an expected dispersion duration is used to perform bandwidth control. An expected dispersion duration is amount of time before forwarding a specified number of incoming packets to the host (104). For example, the expected dispersion duration may be eight packets every microsecond. In such scenario, eight packets in the receive ring are marked every microsecond as available and may be forwarded to the host. The expected dispersion duration may be used in conjunction with an available marker and an unavailable marker. Specifically, when an unavailable marker is associated with the packet, then the packet is not available to send to the host. In such cases, the packet is placed (if there is available space) in the corresponding receive ring. Conversely, the available marker indicates that the packet is ready to transmit to the host. Thus, for example, unavailable markers are associated with packets when the packets are received. When the expected dispersion duration elapses, then a specified number of packets may be associated with an available marker. The packets that are associated with the available marker may then be sent to the host.

Returning to the receive ring (108, 110, 112, 114), each RR (108, 110, 112, 114) is associated with a non-global container (138, 140, 142) or a packet destination in a global container (136). Thus, the bandwidth of the receive ring (108, 110, 112, 114) identifies the bandwidth of a non-global container (138, 140, 142) or a packet destination in a global container (136). Further, once the RR (108, 110, 112, 114) is associated with a non-global container (138, 140, 142) or a packet destination in a global container (136), the container ID (discussed below) corresponding to the a non-global container (138, 140, 142) or the packet destination ID (discussed below) corresponding to a packet destination in a global container (136) is associated with the RR (108, 110, 112, 114). For example, if RR 2 (110) is associated with non-global container 1 (138), then the container ID corresponding to non-global container 1 (138) is associated with RR 2 (110).

Associating the RR (108, 110, 112, 114) with the non-global container (138, 140, 142) or the packet destination in a global container (136) may include, but is not limited to: (i) storing the container ID or packet destination ID in the RR (108, 110, 112, 114), (ii) associating each incoming packet stored in the RR (108, 110, 112, 114) with the container ID or packet destination ID, or (iii) maintaining a RR-Container mapping in the NIC (102), where the RR-Container mapping specifies the container ID (or packet destination ID) for the non-global container (138, 140, 142) (or the packet destination in a global container (136)) associated with each RR (108, 110,112, 114) in the NIC (102).

In one embodiment of the invention, in addition to associating the RR (108, 110, 112, 114) with a container ID or packet destination ID, each RR (108, 110, 112, 114) is associated with one or both of the following cookies: (i) a VNIC cookie and a (ii) Network Layer cookie. The VNIC cookie specifies a function entry point into a specific VNIC in the host and the Network Layer cookie specifies a function entry point into the Network Layer (132).

In addition, each RR (108, 110, 112, 114) is associated with an acceptor function. The acceptor function takes as input: (i) one of the aforementioned cookies (VNIC cookie or Network Layer cookie); (ii) an incoming packet in the RR; and (iii) the container ID or packet destination ID. If the VNIC cookie is used as input to the acceptor function, then the incoming packet and container ID are sent to the VNIC specified in the VNIC cookie. Alternatively, if the Network Layer cookie is used as input to the acceptor function, then the incoming packet and container ID are sent to the Network Layer (132).

For example, an incoming packet in RR 2 (110) may be sent to VNIC 2 (126) using a VNIC cookie that specifies VNIC 2 (126) or the incoming packet may be sent directly to the Network Layer (132) using the Network Layer cookie. In one embodiment of the invention, the Network Layer cookie allows the incoming packet to bypass the MAC layer (i.e., the layer in which the VNIC resides) thereby reducing the amount of processing required to send the incoming packet from the RR to the non-global container or packet destination.

In one embodiment of the invention, the container ID (or packet destination ID) is not stored in the RR (108, 110, 112, 114); rather, the container ID (or packet destination ID) is stored in the VNIC associated with the RR. For example, VNIC 2 (126) stores the container ID for non-global container 1 (138) instead of RR 2 (110). In such cases, the aforementioned acceptor function does not require the container ID (or packet destination ID) as input.

In one embodiment of the invention, the RR (108, 110, 112, 114) or VNIC may include the VNS Instance ID, wherein the VNS Instance ID corresponds to the VNS Instance associated with the non-global container or packet destination in the global container. In such cases, the RR (108, 110, 112, 114) or the VNIC may not include the container ID or the packet destination ID. Further, the acceptor function takes the VNS Instance ID as input instead of or in addition to the container ID or the packet destination ID. In addition, storing the VNS Instance ID corresponds to associating the RR (108, 110, 112, 114) with the non-global container or packet destination in the global container.

In one embodiment of the invention, the VNS Instance ID is not stored in the RR (108, 110, 112, 114); rather, the VNS Instance ID is stored in the VNIC associated with the RR. For example, VNIC 2 (126) stores the VNS Instance ID corresponding to the VNS Instance associated with non-global container 1 (138) instead of RR 2 (110). In such cases, the aforementioned acceptor function does not require the container ID (or packet destination ID) as input.

Continuing with the discussion of FIG. 1, the host (104) includes a device driver (not shown), a number of virtual network interface cards (VNICs) (124, 126, 128, 130), a Network Layer (132), Transport Layer (134), one or more packet destinations in the global container (136), and one or more non-global containers (138, 140, 142). Each of the aforementioned components is described below.

Though not shown in FIG. 1, the device driver is configured to expose the NIC (102) to the host (104). Further, the device driver is configured to expose the individual RRs (108, 110, 112, 114) to the host (104). Exposing the aforementioned components to the host (104) includes providing application programming interfaces (APIs) to allow the host (104) (or components executing therein) to interact with the NIC (102) and the RRs (108, 110, 112, 114) on the NIC (102). Interacting with the NIC (102) typically includes obtaining incoming packets from the NIC (102), sending outbound packets to the NIC (102), and sending and receiving messages and/or signals for the purposes of bandwidth control.

Each VNIC (124, 126, 128, 130) in the host (104) provides the functionality of a NIC for a specific VNS instance. However, unlike the NIC (102), the VNICs (124, 126, 128, 130) are implemented in the host (104), typically, in a MAC layer of the host (104). To components above the VNICs (124, 126, 128, 130) (e.g., the network layer (132), the transport layer (134), the packet destination in the global container (132), and the non-global containers (134, 136, 138)) the VNICs (114, 116, 118, 120) appear as physical NICs.

Each VNIC (124, 126, 128, 130) is associated with a MAC address and an IP address. Further, each VNIC (124, 126, 128, 130) may be optionally associated with a TCP port or UDP port. Further, each VNIC (124, 126, 128, 130) is associated with a RR (108, 110, 112, 114) such that the VNICs (124, 126, 128, 130) obtain incoming packets from the RR (108, 110, 112, 114) with which it is associated. For example, VNIC 1 (124) obtains incoming packets from RR 1 (108). In addition, each VNIC (124, 126, 128, 130) is configured to send incoming packets received from an associated RR (108, 110, 112, 114) to the Network layer (132).

In one embodiment of the invention, the Network layer (132) is configured to perform Network layer processing. Network layer processing corresponds to functionality to manage packet addressing and delivery on a network (e.g., functionality to support Internet Protocol (including, but not limited to, IPv4 and IPv6), Address Resolution Protocol (ARP), Internet Control Message Protocol (ICMP), etc.).

The Network layer (132) shown in FIG. 1 is used by all packet destinations in the global container (e.g., 136) as well as all non-global containers (138, 140, 142). However, the specific portions of the Network layer (132) implemented for a packet destination (136) or non-global container (138, 140, 142) depend on the VNS Instance parameters associated with the packet destination (136) or non-global container (138, 140, 142).

Said another way, the Network layer (132) corresponds to a common set of methods used to perform Network layer (132) processing. However, one or more of the methods in the Network layer (132) requires one or more VNS Instance parameters as input, for example, one method may require the IP address associated with a non-global container (138, 140, 142) as well as the IP routing algorithm (e.g., RIP, OSPF, etc.). Thus, depending on the VNS Instance parameters input into the one or more of the aforementioned methods, the manner in which packets for a first non-global container are processed may be different than the manner in which packets for a second non-global container are processed.

In one embodiment of the invention, the Transport layer (134) is configured to perform Transport layer processing. Transport layer processing corresponds to functionality to manage the transfer of packets on the network (e.g., functionality to support Transmission Control Protocol, User Datagram Protocol, Stream Control Transmission Protocol (SCTP), etc.).

The Transport layer (134) shown in FIG. 1 is used by all packet destinations in the global container (e.g., 136) as well as all non-global containers (138, 140, 142). However, the specific portions of the Transport layer (134) implemented for a packet destination (136) or non-global container (138, 140, 142) depends on the VNS Instance parameters associated with the packet destination (136) or non-global container (138, 140, 142).

Said another way, the Transport layer (134) corresponds to a common set of methods used to perform Transport layer (134) processing. However, one or more of the methods in the Transport layer (134) requires one or more VNS Instance parameters as input, for example, one method may require a protocol to implement (e.g., TCP or UDP). Thus, depending on the VNS Instance parameters input into the one or more of the aforementioned methods, the manner in which packets for a first non-global container are processed may be different than the manner in which packets for a second non-global container are processed.

In one embodiment of the invention, the Network layer (132) and the Transport layer (134) are configured to support multithreading. Thus, multiple non-global containers and/or packet destinations in the global container may be simultaneously processing packets in the Network layer (132) and the Transport layer (134).

As shown in FIG. 1, the host (104) includes a global container (101) and a number of non-global containers (138, 140, 142). The global container (101) corresponds to an isolated execution environment within the host (104). Further, each non-global container (138, 140, 142) corresponds to an isolated execution environment within the global container (101). All of the containers (global and non-global) share a common kernel and, accordingly, are executing the same operating system. While all of the aforementioned containers share a common kernel, the non-global containers (138, 140, 142) are configured such that processes executing in a given non-global container are restricted to execute in the non-global container and have no access to resources not assigned to the non-global container. The isolated execution environments of each non-global container (138, 140, 142), as well as the global container (101), are managed by a container management component (not shown) executing on the host (104). The container management component typically executes outside of the global container (101). An example of a container is a Solaris™ Container. (Solaris is a trademark of Sun Microsystems, Inc. of California, USA).

Each of the non-global containers (138, 140, 142) is configured to send and receive packets to and from the NIC (102) using the Network layer (132) and the Transport layer (134). In one embodiment of the invention, the packet destination in the global container (136) corresponds to a process executing in the global container (101), where the process is configured to send and receive packets but does not include its own internal networking stack. Rather, the packet destination (136) uses the Network layer (132) and the Transport layer (134) executing in the global container (136).

In one embodiment of the invention, each non-global container (138, 140, 142) and the global container are identified by a container ID. The container ID uniquely identifies the container in the host (104). Further, each packet destination in the global container (136) is also associated with an ID (i.e., a packet destination ID). The packet destination ID uniquely identifies the packet destination in the global container (101).

In one or more embodiments of the invention, the host (104) may also include a VNS database (not shown) and a Container-VNS Instance Mapping (not shown). The VNS database includes VNS Instance parameters for each VNS Instance in the host. Typically, there is one VNS Instance for each non-global container (138, 140, 142) and at least one VNS Instance for the packet destinations in the global container (136) (or there may be multiple VNS Instances in the global container, where each packet destination is associated with one of the multiple VNS instances). In one embodiment of the invention, a VNS Instance corresponds to grouping of VNS Instance parameters and is identified by a VNS Instance ID. The VNS Instance ID uniquely identifies the VNS Instance in the host (104).

In one embodiment of the invention, a VNS Instance parameter corresponds to any parameter that is associated with networking. Examples, of VNS Instance parameters may include, but are not limited to, Media Access Control (MAC) address, Internet Protocol (IP) address, IP routing algorithm (e.g., Routing Information Protocol (RIP), Open Shortest Path First (OSPF), etc.), Transport layer protocol (e.g., Transmission Control Protocol (TCP), User Datagram Protocol (UDP), an IP routing table, default route (i.e., the route, set in the IP routing table, used when no other entry in the IP routing table matches the destination IP address of the packet), TCP parameters (i.e., parameters in the TCP that may be changed, for example, bandwidth-delay product, buffer size, etc.), IP parameters (i.e., parameters in the IP that may be changed), TCP port number, and UDP port number.

In one embodiment of the invention, each VNS Instance includes a value for all VNS Instance parameters for the particular VNS Instance. The value for a particular VNS instance parameter may be specified or a default value for the VNS Instance parameter may be used. For example, assume that each VNS instance must specify an IP address, an IP routing algorithm, a default route, and a Transport Layer protocol. Further, assume that only values for the IP address, and IP routing algorithm are provided. Accordingly, default values are obtained for the default route and Transport Layer Protocol.

The VNS Instance parameters are typically specified by a packet destination in the global container or a non-global container. The specific values for VNS Instance parameters is typically dictated by the requirements of the packet destination in the global container or the non-global container with which the VNS Instance is associated.

In one embodiment of the invention, the Container-VNS Instance Mapping maps each container (global and non-global) to a VNS Instance. The container is typically identified by a container ID and the VNS Instance is typically identified by the VNS Instance ID. In one embodiment of the invention, if the global container includes multiple packet destinations, then each of the packet destinations may be identified by a packet destination ID. Further, if the packet destination IDs are included in the Container-VNS Instance Mapping, then the global container may not be listed in an entry in the Container-VNS Instance Mapping. Further, the Container-VNS Instance Mapping may additionally include mappings between packet destinations in the global container and VNS instances, Both the VNS database and a Container-VNS Instance Mapping are typically located in the global container (136).

In one or more embodiments of the invention, a virtual network stack (VNS) database (not shown) includes dynamic entries and, optionally, static parameters. Each of the dynamic entries identifies a VNS Instance using a VNS Instance ID and includes the VNS Instance parameters associated with the VNS Instance. In one embodiment of the invention, the VNS database is configured to receive a VNS Instance ID, locate the corresponding dynamic entry using the VNS Instance ID, and return the VNS Instance parameters associated with the VNS Instance ID.

In one embodiment of the invention, the VNS database also includes logic to determine which of the VNS Instance parameters to return at any given time. For example, if a process in the Network layer sends the VNS Instance ID to the VNS database, then the VNS database may only return VNS Instance parameters associated with the Network layer (i.e., which may be used by the Network layer). In such cases, all other VNS Instance parameters are not sent to the Network layer.

The VNS database may include default values for VNS instance parameters. As discussed above, the default values correspond to values used for any VNS instance parameter not specified for the VNS Instance.

In one embodiment of the invention, the VNS Instance parameters for a particular VNS Instance may include both the VNS Instance parameters specified for the VNS Instance as well as the default values for VNS Instance parameters not specified for the VNS Instance. Alternatively, the VNS Instance parameters for a particular VNS Instance only include the VNS Instance parameters specified for the VNS Instance and the default values for the VNS Instance parameters not specified for the VNS Instance are located in a separate location in the VNS database or in another location in the host.

In one embodiment of the invention, the static parameters correspond to parameters used by all VNS instances in the host (104). The static parameters typically correspond to parameters that must be the same for all VNS instances executing on the host (104). As discussed above, the static parameters are optionally located in the VNS database. As an alternative, the static parameters may be located in a separate location in the global container or may be hard coded into the appropriate locations in the Network layer (132) and the Transport layer (134).

In one or more embodiments of the invention, a Container-VNS Instance Mapping includes a mapping of container ID to VNS Instance ID. The aforementioned mapping associates the VNS Instance with a container. Thus, when an incoming packet for the container is received by the host, the Container-VNS Instance Mapping may be used to determine which of the VNS instances to use to process the incoming packet. Further, when the container issues an incoming packet, the Container-VNS Instance Mapping may be used to determine which of the VNS instances to use to process the outbound packet.

As discussed above, each packet destination in the global container (136) may be identified with a packet destination ID and associated with a VNS Instance. In such cases, the Container-VNS Instance Mapping also includes a packet destination-VNS Instance mapping.

FIG. 2 shows a system for performing bandwidth control for outbound packets (i.e., packets from the host (104) to transmit via a network (100) in accordance with one or more embodiments of the invention. As shown in FIG. 2, the system includes the host (104) and the NIC (102). As shown in FIG. 2, the host (104) may include the same components as shown in FIG. 1 and discussed above. Specifically, a non-global container (138, 140, 142) and packet origin in the global container (168) includes functionality to generate outbound packets in accordance with one or more embodiments of the invention. The packet origin in the global container (168) may be the same or different component as the packet destination in the global container (i.e., 136 in FIG. 1). The transport layer (134), network layer (132), and VNIC (124, 126, 128, 130) includes functionality to process the outbound packets as discussed above.

In addition, or as an alternative to, the components discussed above, the NIC may include transmit rings (158, 160, 162, 164), transmit regulation engines (150, 152, 154, 156), and an outbound rate regulation engine (166) in order to perform bandwidth control for outbound packets.

In one or more embodiments of the invention, each transmit ring (158, 160, 162, 164) is configured to receive outbound packets from a specific non-global container (138, 140, 142) or a particular packet origin in the global container (168). In one embodiment of the invention, each transmit ring (158, 160, 162, 164) corresponds to a buffer in the NIC (102), which is configured to store a finite number of outbound packets.

In one or more embodiments of the invention, a transmit regulation engine (150, 152, 154, 156) is interposed between the transmit ring (158, 160, 162, 164) and the VNIC (124, 126, 128, 130). The transmit regulation engine (150, 152, 154, 156) may be firmware on the NIC (102) that includes functionality to populate a transmit ring (e.g., 158, 160, 162, 164). In one or more embodiments of the invention, each transmit regulation engine (150, 152,154, 156) may include sending stop and resume signals to the host (104) based on whether the maximum number of packets is in the transmit ring (158, 160, 162, 164). The maximum number of packets are determined to be in the transmit ring (158, 160, 162, 164) when the transmit ring (158, 160, 162, 164) is full. Rather than sending the stop signal and resume signal when the transmit ring (158, 160, 162, 164) is full, the sending of a stop or resume signal may be based on a threshold number of packets are in the receive ring.

In one or more embodiments of the invention, an outbound rate regulation engine (166) includes functionality to obtain packets from the transmit rings (158, 160, 162, 164) and send the packets via the network (100) to the packets' destinations. The outbound rate regulation engine (166) may obtain the packets from each transmit ring (158, 160, 162, 164) in a round robin manner. For example, the outbound rate regulation engine (166) may obtain packets from transmit ring 1 (158), then obtain packets from transmit ring 2 (160), etc. Those skilled in the art will appreciate that if the transmit ring (158, 160, 162, 164) does not have packets or the packets are not available, then the outbound rate regulation engine (166) may skip that particular transmit ring (e.g., 158, 160, 162, 164) during a pass of the round robin.

In one or more embodiments of the invention, the transmit regulation engine (150, 152, 154, 156), the outbound rate regulation engine (166), or the size of the transmit ring (158, 160, 162, 164) may be used for performing bandwidth control for the transmission of packets based on one or more bandwidth parameters. Similar to bandwidth parameters for incoming packets, in one or more embodiments of the invention, the bandwidth parameters for outbound packets may specify one or more of the following: a size of the transmit ring (158, 160, 162, 164), an identifier of the transmit ring (158, 160, 162, 164), and the allocated bandwidth for the transmit ring (158, 160, 162, 164). In one or more embodiments of the invention, the size of the transmit ring (158, 160, 162, 164) is the number of descriptors allocated to the transmit ring (158, 160, 162, 164

In one or more embodiments of the invention, the identifier for the transmit ring (158, 160, 162, 164) may be a VNS instance identifier (discussed below), a VNIC identifier, or any other unique identifier that may be used to identify the transmit ring from other transmit rings on the NIC (104).

The follow discussion details how different components in the NIC (102) may be used to perform bandwidth control in accordance with one or more embodiments of the invention. In one embodiment of the invention, an available marker and/or an unavailable marker may be used by the NIC (102) to perform bandwidth control. Specifically, when an unavailable marker is associated with the packet, then the packet is not available to transmit on the network. Conversely, the available marker indicates that the outbound rate regulation engine may transmit the packet. For example, consider the scenario in which the allocated bandwidth for transmit ring 4 (164) is five packets per time period. In the example, at each time period, transmit regulation engine 4 (156) may associate the oldest five packets in the transmit ring (158, 160, 162, 164) with an available marker. In the example, the outbound regulation engine (166) may be configured to only transmit packets that are associated with an available marker. Thus, the outbound regulation engine (166) only sends five packets per time period for the non-global container 3 (142).

In one of the invention, the outbound rate regulation engine (166) may perform bandwidth control. For example, the outbound rate regulation engine (166) may identify the bandwidth of each of the transmit ring (158, 160, 162, 164) in a time period. The outbound rate regulation engine (166) may obtain packets proportionally to the bandwidth from each transmit ring (158, 160, 162, 164). In the example, consider the scenario in which transmit ring 1 (158) has an allocated bandwidth of five packets per time period; transmit ring 2 (160) has an allocated bandwidth of two packets per time period, transmit ring 3 (162) has an allocated bandwidth of four packets per time period; and transmit ring 4 (166) has an allocated bandwidth of three packets per time period. In the example, the outbound rate regulation engine (166) may, in one pass of a round-robin, obtain five packets from transmit ring 1 (158), two packets from transmit ring 2 (160), four packets from transmit ring 3 (162), and three packets from transmit ring 4 (166).

In one or more embodiments of the invention, the size of the transmit ring (158, 160, 162, 164) may be used to perform bandwidth control. In such scenarios, the transmit regulation engine (150, 152, 154, 156) may populate the corresponding transmit ring (158, 160, 162, 164) with packets until the corresponding transmit ring (158, 160, 162, 164) is full. The outbound rate regulation engine (166) may obtain all packets in each pass of the round robin from each transmit ring (158, 160, 162, 164). For example, consider the scenario in which transmit ring 1 (158) has an allocated bandwidth of five packets per time period and each pass of the round robin takes one time period. In the example, the size of transmit ring 1 (158) may be set to allow for only five packets in the transmit ring at once. Thus, in each time period, a maximum of five packets are stored in the transmit ring. Any additional packets may be dropped.

FIGS. 3-5, 7, and 9 show flowcharts in accordance with one or more embodiments of the invention. Wile the various steps in these flowcharts are presented and described sequentially, one of ordinary skill will appreciate that some or all of the steps may be executed in different orders, may be combined or omitted, and some or all of the steps may be executed in parallel. In addition, steps such as store and receive acknowledgements have been omitted to simplify the presentation.

Figure 3:
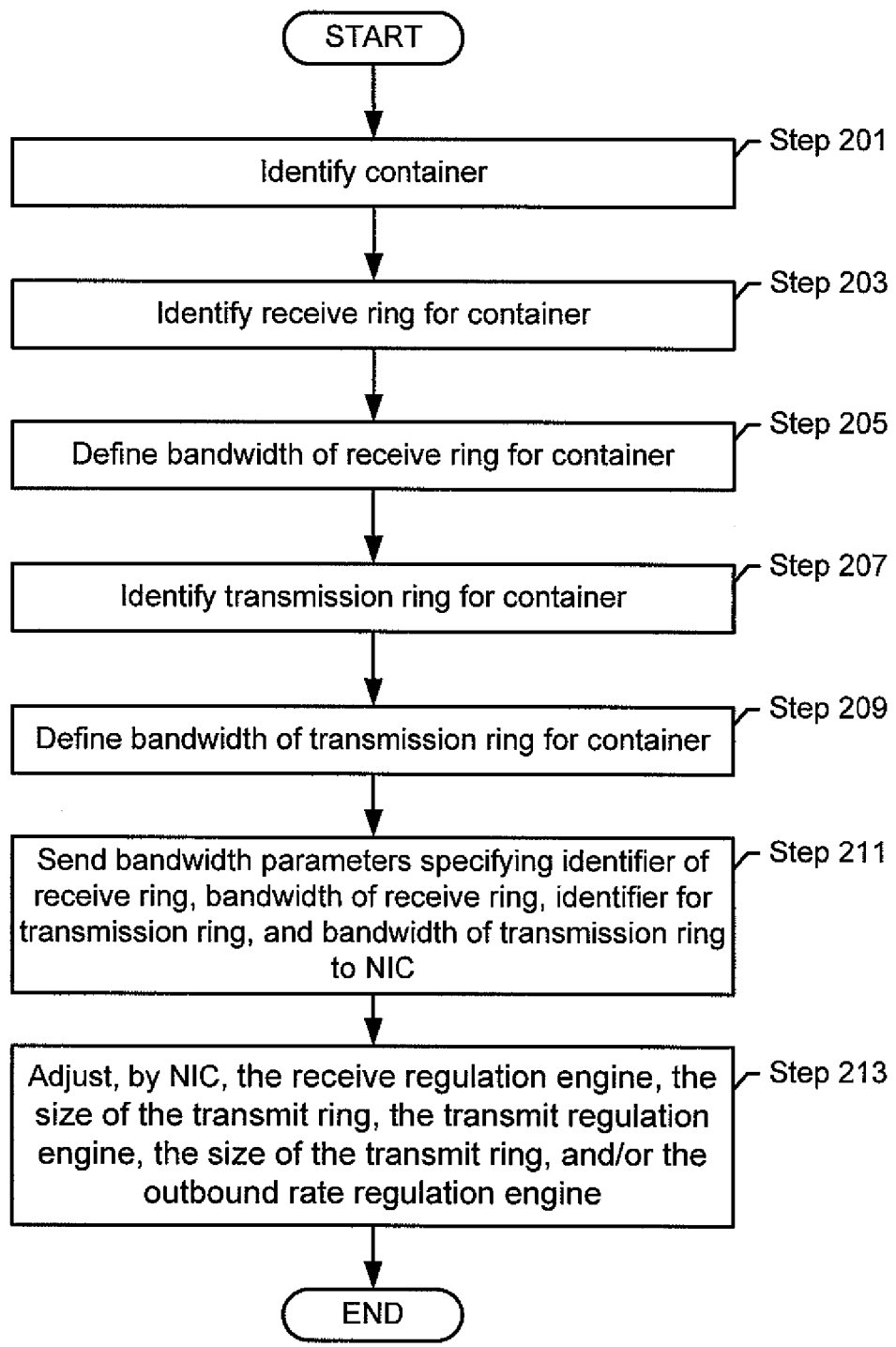
FIGS. 3-4 show flowcharts for bandwidth control in accordance with one or more embodiments of the invention.
Figure 4:
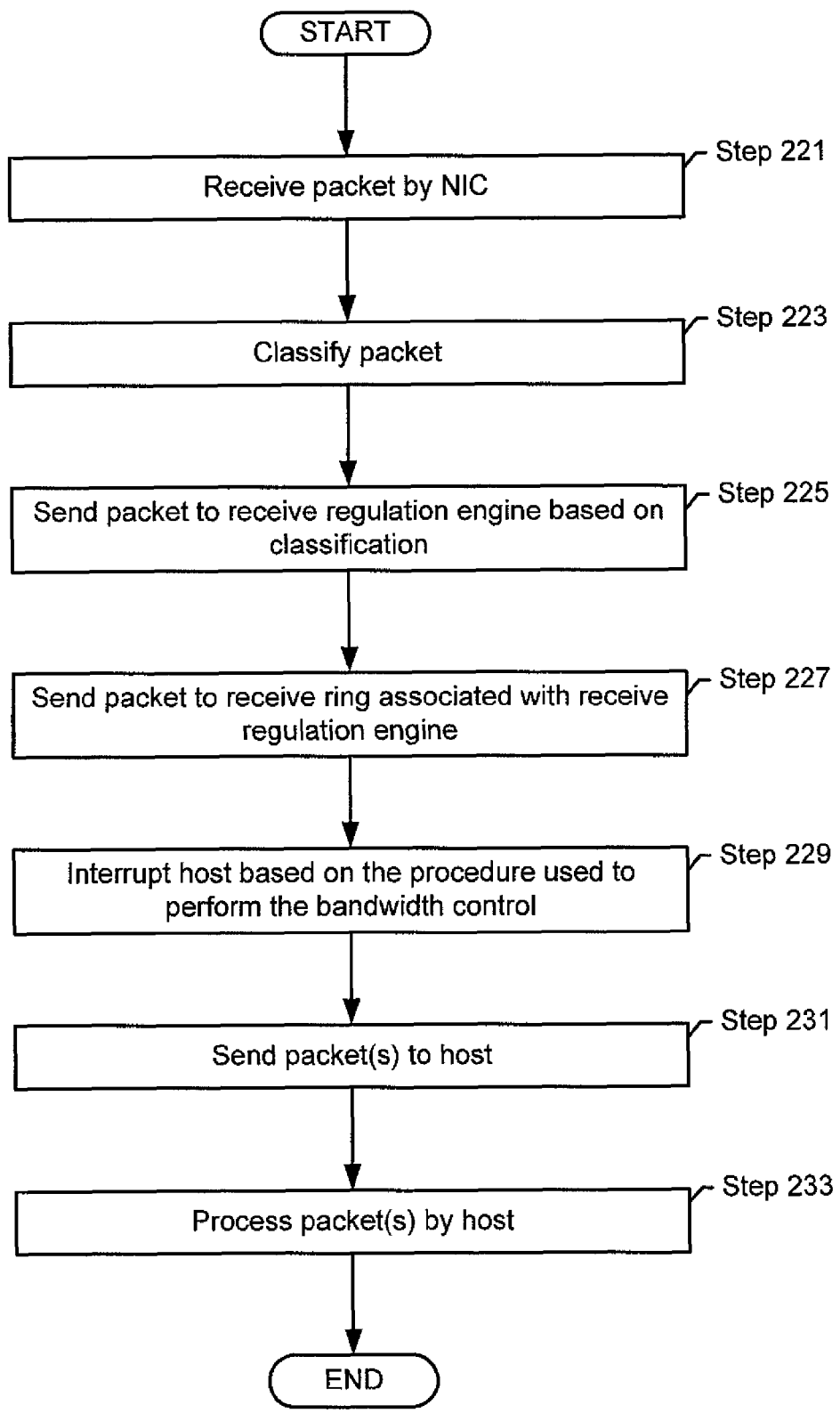

FIGS. 3-4 show flowcharts for bandwidth control in accordance with one or more embodiments of the invention. FIG. 3 shows a flowchart of a method for allocating bandwidth on the host to perform bandwidth control on the NIC. In one or more embodiments of the invention, an administrator may adjust the allocated bandwidth using a user interface in the global container. The user interface may be a graphical user interface, a command line interface, or any other type of interface. In one or more embodiments of the invention, a container is identified (Step 201). Specifically, the administrator identifies the container for which the administrator wants to set or adjust bandwidth.

The receive ring for the container is identified (Step 203). The receive ring may be identified by the administrator or the host. Specifically, the receive ring identifier is obtained. As discussed above, the receive ring identifier may be the VNS instance identifier, a VNIC identifier, or any other unique identifier that may be used to identify the receive ring from other receive rings on the NIC.

In Step 205, the allocated bandwidth of the receive ring for the container is defined. Bandwidth may be allocated by specifying a number of packets per time period allowed for the container or by specifying a percentage of the total bandwidth provided by the NIC that is allocated to the container.

Similar to the receive ring, the transmit ring for the container is identified (Step 207). If the transmit ring and the receive ring use the same identifier (e.g., the VNS identifier), then a separate step of identifying the transmit ring may not be required. In Step 209, the allocated bandwidth of the transmit ring for the container is defined. The bandwidth of the transmit ring may be allocated in a as the bandwidth for the receive ring.

In Step 211, the bandwidth parameters are sent to the NIC. In one embodiment of the invention, sending the bandwidth parameters to the NIC may include specifying the identifier of the receive ring, the bandwidth of the receive ring, the identifier of the transmit ring, the allocated bandwidth of the transmit ring, or any of the bandwidth parameters discussed above with reference to FIG. 1 and FIG. 2. In one or more embodiments of the invention, transmitting the bandwidth parameters to the receive ring may be performed using the device driver for the NIC.

In step 213, the NIC adjusts the receive regulation engine, the size of the transmit ring, the transmit regulation engine, the size of the transmit ring, and/or the outbound rate regulation engine using the bandwidth parameters. The NIC adjusts the above components depending on the mechanism(s) used to perform bandwidth control.

For example, if the bandwidth control is performed based on the size of the transmit or receive ring, then the NIC accesses the transmit or receive ring and adjusts the number of descriptors that may be stored by the transmit or receive ring. For incoming packets, the NIC may also adjust the number of interrupts which are allowed to be issued in a particular time period and the threshold number of packets to arrive before generating an interrupt. Further, for outbound packets, the NIC may adjust the threshold number of packets received before issuing a stop signal. The NIC may also, or alternatively, adjust the threshold number of descriptors available before a resume signal is issued. In another example, if the bandwidth control is performed by the receive regulation engine marking packets as available, then the receive regulation engine adjusts the expected dispersion duration at which packets are marked as available based on the bandwidth parameter. Using the adjusted allocated bandwidth, the NIC may perform bandwidth control for the host.

Figure 5:
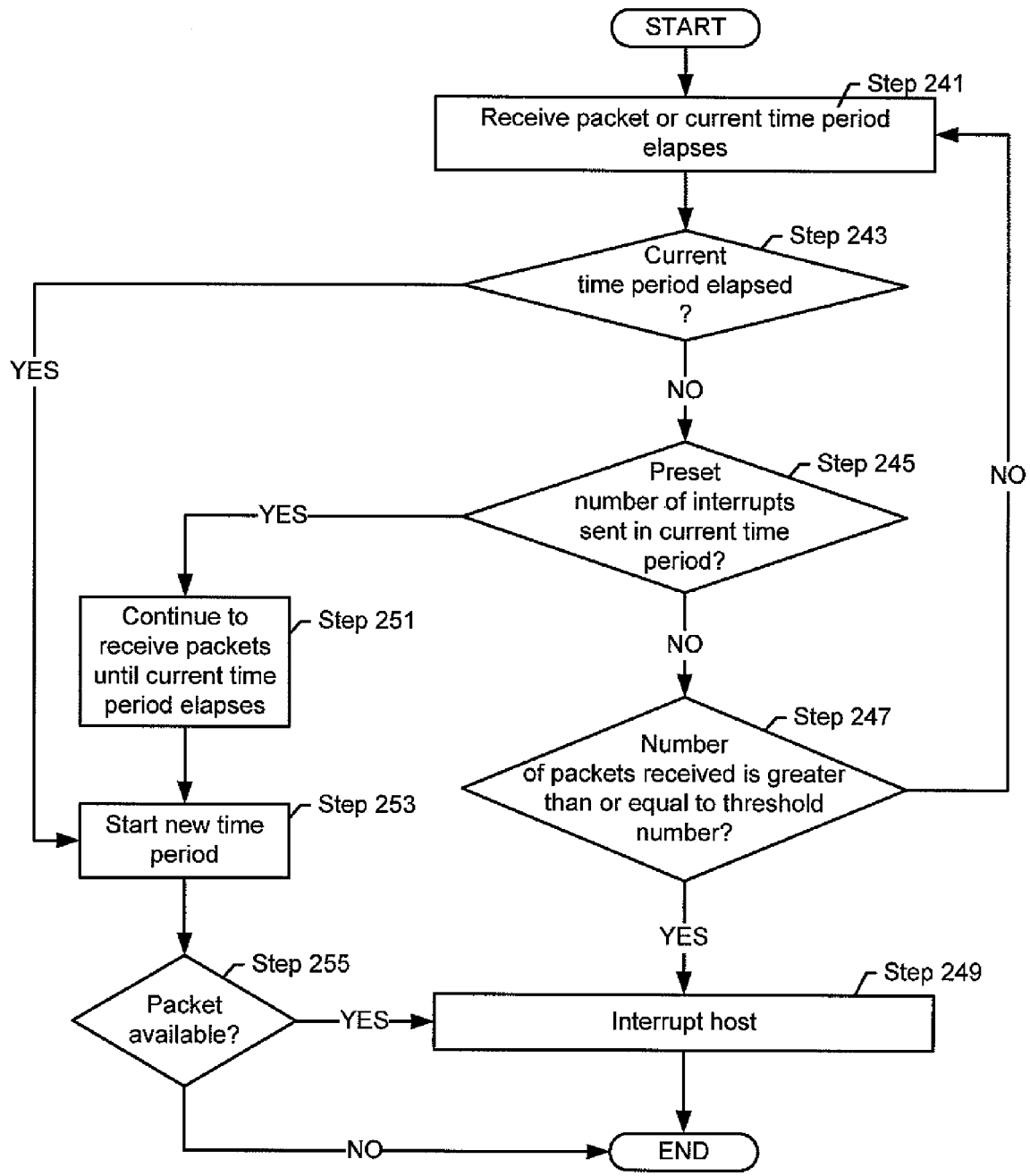
FIG. 5 shows a flowchart for bandwidth control for receiving packets in accordance with one or more embodiments of the invention.
Figure 7A:
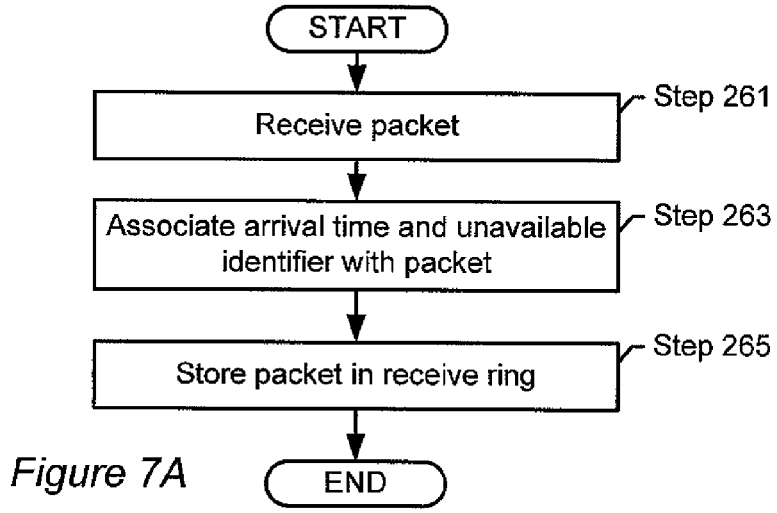
FIGS. 7A-7B show flowcharts for bandwidth control for receiving packets in accordance with one or more embodiments of the invention.
Figure 7B:
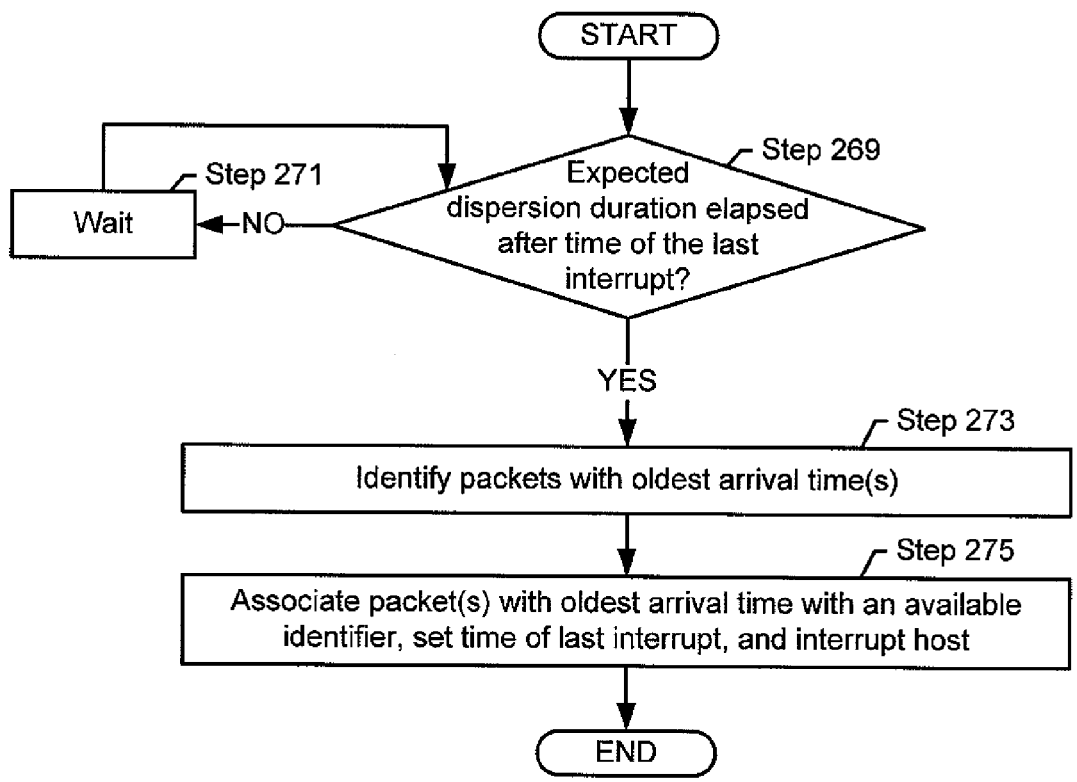

FIG. 4 shows a flowchart for bandwidth control for receiving packets in accordance with one or more embodiments of the invention. As shown in FIG. 4, a packet is received by a NIC (Step 221). The packet is then classified using the hardware classifier in the NIC (Step 223). In one embodiment of the invention, the destination IP address, the destination MAC address, the destination port (TCP or UDP) or a combination thereof may be used to classify the packet. The packet is then sent to the receive regulation engine (Step 225). Those skilled in the art will appreciate that sending packets to the receive regulation engine may include notifying the receive regulation engine that a given packet stored in at a memory location in the NIC is ready for processing. The receive regulation engine sends the packet to the receive ring associated with the receive regulation engine (Step 227). Those skilled in the art will appreciate that sending packets to the receive ring may include notifying the receive ring that a given packet stored in at a memory location in the NIC is ready for processing. In one or more embodiments of the invention, the packet is associated with a descriptor for the receive ring. Based on the procedure used to perform the bandwidth control, the host is interrupted (Step 229). Interrupting the host may be performed by sending a signal to the device driver for the NIC. In one or more embodiments of the invention, the host is interrupted when the packet is available. Steps 227 and 229 are described below and FIGS. 5, 7A, and 7B. Specifically, FIG. 5 shows one method for determining when to interrupt the host and which packets to send to the host. FIGS. 7A and 7B show another method for determining when to interrupt the host and what packets to send to the host. Those skilled in the art will appreciate that an amalgamation of the steps described in FIGS. 5, 7A, and 7B may be preformed.

Continuing with FIG. 4, once the host is interrupted, an interrupt routine on the host may request to receive all available packets for the receive ring. Accordingly, the packets are sent to the host (Step 231) and subsequently processed by the host (Step 233). The host may process the packet by optionally sending the packet to the VNIC associated with the receive ring. The target ID and/or the VNS Instance ID may be sent with the packet depending on whether the target ID and/or the VNS Instance ID is associated with the receive ring. In one embodiment of the invention, the target of the packet is a non-global container or a packet destination in the global container. The VNIC subsequently sends the packet to the Network Layer. The target ID and/or the VNS Instance ID may be sent with the packet depending on the implementation. As discussed above, the target ID and/or the VNS Instance ID may be obtained from the VNIC.

The host (or a process executing thereon) obtains the VNS Instance parameters using the VNS Instance ID or the target ID. If the VNS Instance ID is provided, then the VNS Instance parameters may be obtained directly from the VNS database. If the target ID is available, then the target ID is used to obtain the VNS Instance ID corresponding to the VNS Instance associated with the target using the Container-VNS mapping. The VNS Instance ID is then used to obtain the VNS Instance parameters from the VNS database.

Regardless of how they are obtained, the VNS Instance parameters are then used by the Network layer and the Transport layer to process the packet. The processed packet is then sent to the target. In one embodiment of the invention, the packet may be forwarded directly from the receive ring to the network layer.

FIG. 5 shows a flowchart of a procedure for performing bandwidth control by the receive regulation engine in accordance with one or more embodiments of the invention. Specifically, FIG. 5 further describes steps 227 and 229 described above and in FIG. 4. FIG. 5 shows a flowchart of a method for performing bandwidth control according to time periods. As discussed above, a time period is a duration of time in which only a preset number of interrupts to the host are allowed. At the end of the time period, the host may receive packets in the receive ring. In Step 241, a packet is received or the current time period elapses. Specifically, the receive regulation engine may receive a new packet for the receive ring or a clock or other such time counter associated with the receive regulation engine may indicate that the current time period has elapsed. A determination is made whether the current time period has elapsed (Step 243).

If the current time period has not elapsed, then a determination is made about whether the receive regulation engine has sent the preset number of allocated interrupts to the host in the current time period (Step 245). As discussed above, the receive ring is allocated a preset number of interrupts. Determining whether the interrupt exists in the current time period may be performed using a counter on the NIC that is associated with the receive ring. Each time an interrupt is generated, the counter is updated (e.g., decremented when the counter counts the number of allocated interrupts remaining in the current time period or incremented when the counter counts the number of interrupts sent in the current time period). At the end of the current time period, the counter may be reset. One skilled in the art will appreciate that the preset number of interrupts may be set to zero to indicate that the only interrupt to the host is at the end of the current time period.

In one or more embodiments of the invention, if the host has not sent the preset number of allocated interrupts in the current time period, then a determination is made about whether the number of packets received is greater than or equal to a threshold number (Step 247). As discussed above, the threshold number of packets is the number of packets that the receive ring is to receive before the host is interrupted.

If the number of packets is greater than or equal to the threshold number, then the host is interrupted (Step 249). Interrupting the host may be performed as discussed above and in Step 229 of FIG. 4.

Alternatively, if the number of packets is not greater than or equal to the threshold number, then the receive ring may continue to receive packets and/or wait until the current time period elapses (Step 241). If the receive ring is full, then the receive ring may start to drop packets. Therefore, in one or more embodiments of the invention, the total number of packets that the receive ring can receive is the size of the receive ring multiplied by the preset number of interrupts with an additional interrupt (i.e., total packets/time period=size of receive ring*(preset number+1)).

Returning to Step 245, if the host has sent the preset number of allocated interrupts in the current time period, then the receive ring may continue to receive packets until the current time period elapses (Step 251). Each time the NIC receives a packet, the packet is stored in the receive ring.

Once the current time period elapsed, then a new time period is (Step 253).

At this stage, the counter for the preset number of interrupts and the counter for the time period may be reset.

Further, in one or more embodiments of the invention, a determination is made about whether a packet is available (Step 255). Specifically, a determination is made whether the receive ring has a packet. The receive ring may be determined to have a packet if a descriptor of the receive ring is associated with a packet. If a packet is available, then the host is interrupted (Step 249). Interrupting the host may be performed as discussed above in Step 229 of FIG. 4. Alternatively, if a packet is not available, then the processing may end or continue for the next time period.

Although FIG. 5 shows that the host is interrupted only once, those skilled in the art will appreciate that the method may repeat starting with Step 241 to continue processing packets received on the NIC. FIG. 5 and the discussion below is for exemplary purposes only and not intended to limit the scope of the invention. Thus, the receive regulation engine may continue to receive a packet or detect when the current time period elapses. Further, although FIG. 5 shows a flowchart for a single receive regulation engine, multiple receive regulations engines may perform the method shown in FIG. 5 for their corresponding receive ring.

FIG. 6 shows an example timing chart of bandwidth control for receiving packets in accordance with one or more embodiments of the invention. Specifically, FIG. 6 shows an example of the method discussed above and in FIG. 5. For the example shown in FIG. 6, consider the scenario in which the size of the receive ring allows for five packets, the time period is ten units, the threshold number of packets is five packets, and the preset number of interrupts is two. As shown in FIG. 6, the first column shows the current time unit (300), the second column shows the packets received during the current time unit (302), the third column shows the state of the receive ring during the current time unit (304), and the fourth column shows when an interrupt is issued to the host (306).

In the example, at time unit 0 (308), the receive ring is empty and no packets are received. At time unit 1 (310), packet A is received and stored in the receive ring. Because there is only one packet in the receive ring and the threshold number of packets is five, no interrupts are sent to the host. Packet B is received at time unit 2 (312) and stored in the receive ring with A. At time unit 3 (314), packet C is received. At time unit 4 (316), packets D and E are received. At this time unit, the receive regulation engine determines that the receive ring has five packets, therefore the receive ring is storing the threshold number of packets. Further, the receive regulation engine determines that the preset number of interrupts have not been issued. Accordingly, at time unit 4 (316), an interrupt is sent to the host. Subsequently, the host obtains the packets from the receive ring. Thus, the receive ring no longer includes packets A, B, C, D or E.

Continuing with FIG. 6, packets F and G are received at time unit 5 (318) and stored in the receive ring. At time unit 6 (320), packets H and I are received. At time unit 7 (322), packet J is received and stored with F, G, H, and I in the receive ring. At this time unit, the receive regulation engine determines that the receive ring has five packets. Therefore, the receive ring is currently storing the threshold number of packets at time unit 7 (322). Further, the receive regulation engine determines that an interrupt is remaining before the preset number of interrupts is exceeded. Accordingly, at time unit 7 (322), an interrupt is issued to the host. Subsequently, the host obtains the packets from the receive ring. Thus, the receive ring no longer includes packets F, G, H, I, or J.

At time unit 8 (324), packets K, L, M, N, and O are received and stored in the receive ring. Because there are no more interrupts remaining in this time period, no interrupt is issued. At time unit 9 (326), packets P, Q, R, and S are received but not stored because the receive ring can store only five packets. Accordingly, packets P, Q, R, and S are dropped. At the end of time unit 9 (326), the time period has elapsed. At time unit 10 (not shown), the number of interrupts available is reset to two and, thus, the host is interrupted (not shown) and packets K, L, M, N, and O are sent to the host.

Those skilled in the art will appreciate that FIG. 6 is for exemplary purposes only. In actuality, there may be some delay for sending the interrupt, processing the interrupt by the host, and receiving packets. Further, although in the example, the threshold number of packets is the same as the size of the receive ring, the threshold number of packets may be less than the number of packets that can be stored in the receive ring. In such scenario, rather than sending all packets, the NIC may only send the host the threshold number of oldest packets in the receive ring (assuming the host is operating in FIFO mode as opposed to, for example, FILO mode).

FIGS. 7A-7B show flowcharts for bandwidth control for receiving packets in accordance with one or more embodiments of the invention. FIG. 7A-7B further describes steps 227 and 229 described above and in FIG. 4. FIG. 7A shows a flowchart of a method for the receive regulation engine to initially process a packet in accordance with one or more embodiments of the invention. As shown in FIG. 7A, initially a packet is received by the receive regulation engine (Step 261). In one or more embodiments of the invention, the arrival time and an unavailable marker is associated with the packet (Step 263). The arrival time may be the time the NIC receives the packet or receive regulation engine receives the packet in accordance with one or more embodiments of the invention. Alternatively, the arrival time may be an integer that denotes an ordering of packets in the receive ring. The packet is stored in the receive ring (Step 265).

FIG. 7B shows a flowchart of a method for consuming packets from the receive ring in accordance with one or more embodiments of the invention. In one or more embodiments of the invention, a determination is made whether the expected dispersion duration elapsed since the last interrupt (Step 269). Determining whether the expected dispersion duration has elapsed may be performed using a counter associated with the receive ring. In one or more embodiments of the invention, at each interrupt, the counter may be reset to zero or other such base value. When the counter indicates the expected dispersion duration, then the expected dispersion duration is determined to have elapsed. Alternatively, determining whether the expected dispersion duration has elapsed may be performed by subtracting the time of the last interrupt from the current time. If the expected dispersion duration has not elapsed, then the process waits (Step 271).

When the expected dispersion duration elapses, then the packet(s) with the oldest arrival time(s) is (are) identified (Step 273). The number of packets that are identified is dependent on the bandwidth. For example, if the bandwidth specifies that n oldest packets are to be sent to the host every t time units, and the expected dispersion duration is t/2, then the n/2 oldest packets are identified to be sent to the host.

Accordingly, the packet(s) with the oldest arrival time are associated with an available identifier, the time of last interrupt is set or the counter for the expected dispersion duration is reset, and the host is interrupted (Step 275). The host may be interrupted as discussed above. When the host is interrupted, the host may obtain only the packets associated with an available identifier. Packets that are not associated with an available identifier in the receive ring may be dropped or remain in the receive ring.

In one or more embodiments of the invention, the flowchart shown in FIG. 7B may continually repeat for additional packets that are in the receive ring or arrive in the receive ring. Further, in one or more embodiments of the invention, the method for consuming packets may be performed in parallel by each of the receive rings. In alternative embodiments of the invention, the packets from different receive rings may be consumed in a round robin fashion. For example, while waiting for the expected dispersion duration to elapse from one receive ring, packets may be consumed from another receive ring.

Figure 8:
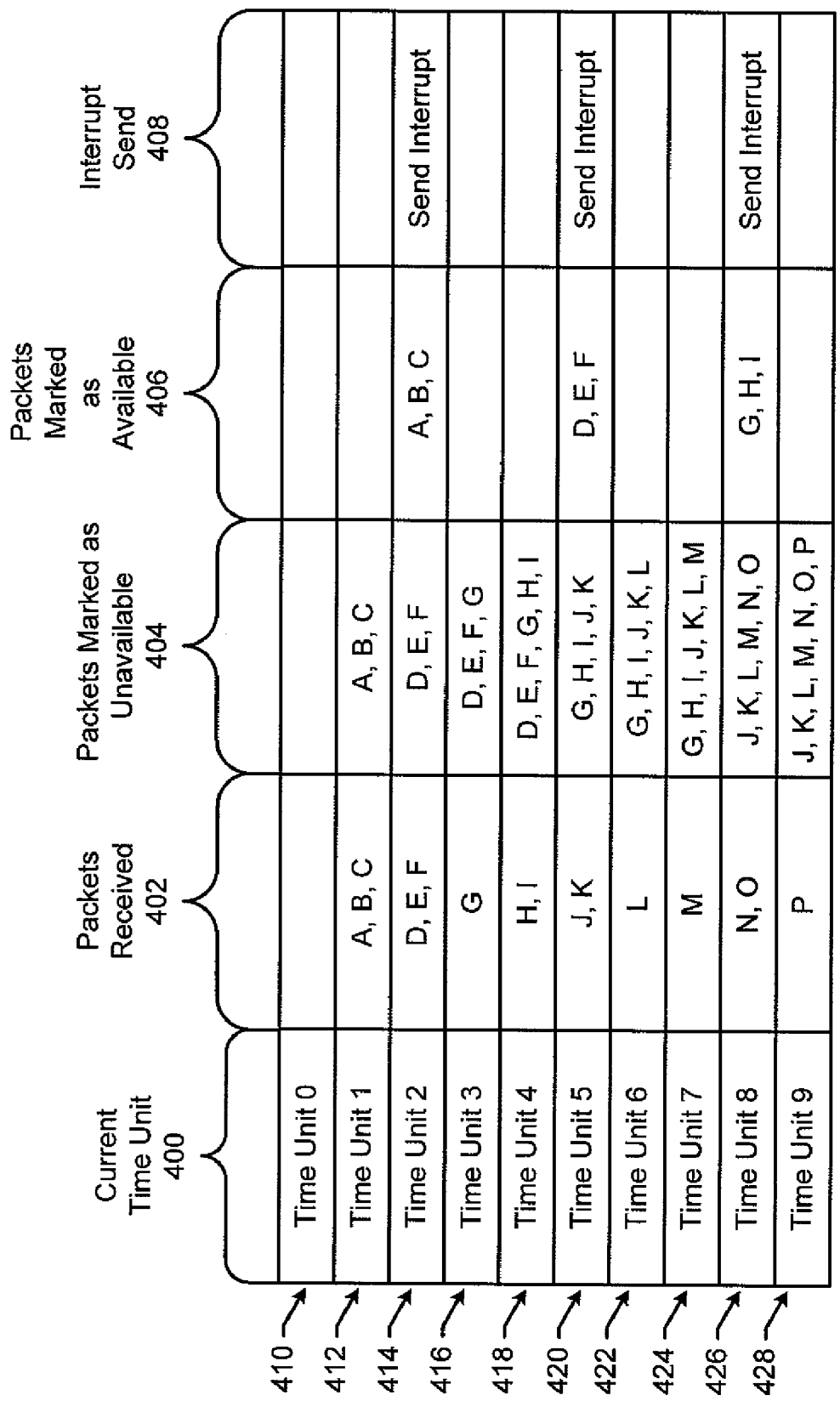
FIG. 8 shows an example timing chart for bandwidth control for receiving packets in accordance with one or more embodiments of the invention.

FIG. 8 shows an example timing chart of bandwidth control for receiving packets in accordance with one or more embodiments of the invention. Specifically, FIG. 8 shows an example of the method discussed above and in FIGS. 7A-7B. For the example shown in FIG. 8, consider the scenario in which the expected dispersion duration is three time units. At each of the three time units, three packets are marked as available. Accordingly, the bandwidth in the example is one packet per time unit. As shown in FIG. 8, the first column shows the current time unit (400), the second column shows the packets received during the current time unit (402), the third column shows the packets in the receive ring that are marked as unavailable (404), the fourth column shows the packets in the receive ring that are marked as available (406), and the fifth column shows when an interrupt is sent (306).

In the example, at time unit 0 (410), the receive ring is empty and no packets are received. At time unit 1 (412), packets A, B, C, are received and stored in the receive ring with an unavailable identifier. Packets D, E, and F are received at time unit 2 (414) and stored in the receive ring with an unavailable identifier. Further, because the expected dispersion duration has elapsed, packets A, B, C are associated with an available identifier and the host is interrupted. At any time after the packets are marked with an available identifier, the host may obtain packets A, B, and C in accordance with one or more embodiments of the invention.

At time unit 3 (416), packet G is received, associated with an unavailable identifier, and stored in the receive ring. At time unit 4 (418), packets H and I are received, associated with an unavailable identifier, and stored in the receive ring. Packets J and K are received at time unit 5 (420), associated with an unavailable identifier, and stored in the receive ring. Further, because the expected dispersion duration elapsed at time unit 5 (420), the three oldest packets (i.e., D, E, and F) are associated with an available identifier and the host is interrupted. Therefore, the host may obtain packets D, E, and F. At time unit 6 (422), packet L is received, associated with an unavailable identifier, and stored in the receive ring. At time unit 7 (424), packet M is received, associated with an unavailable identifier, and stored in the receive ring. Packets N and O are received at time unit 8 (426), stored in the receive ring, and associated with an unavailable identifier. Further, because the expected dispersion duration has elapsed, the three oldest packets (i.e., G, H, and I) in the receive ring are associated with an available identifier. Accordingly, an interrupt is sent to the host. At time unit 9 (428), packet P is received, stored in the receive ring, and associated with an unavailable identifier.

Those skilled in the art will appreciate that FIG. 8 is for exemplary purposes only. In actuality, there may be some delay for sending the interrupt, processing the interrupt by the host, and receiving packets. Further, although in the example, the size of the receive ring seems unlimited, the size of the receive ring may be limited according to the allocated bandwidth for the receive ring. Thus, when the number of packets in the receive ring exceeds the limited number allowed by the size of the receive ring, packets may be dropped.

Figure 9:
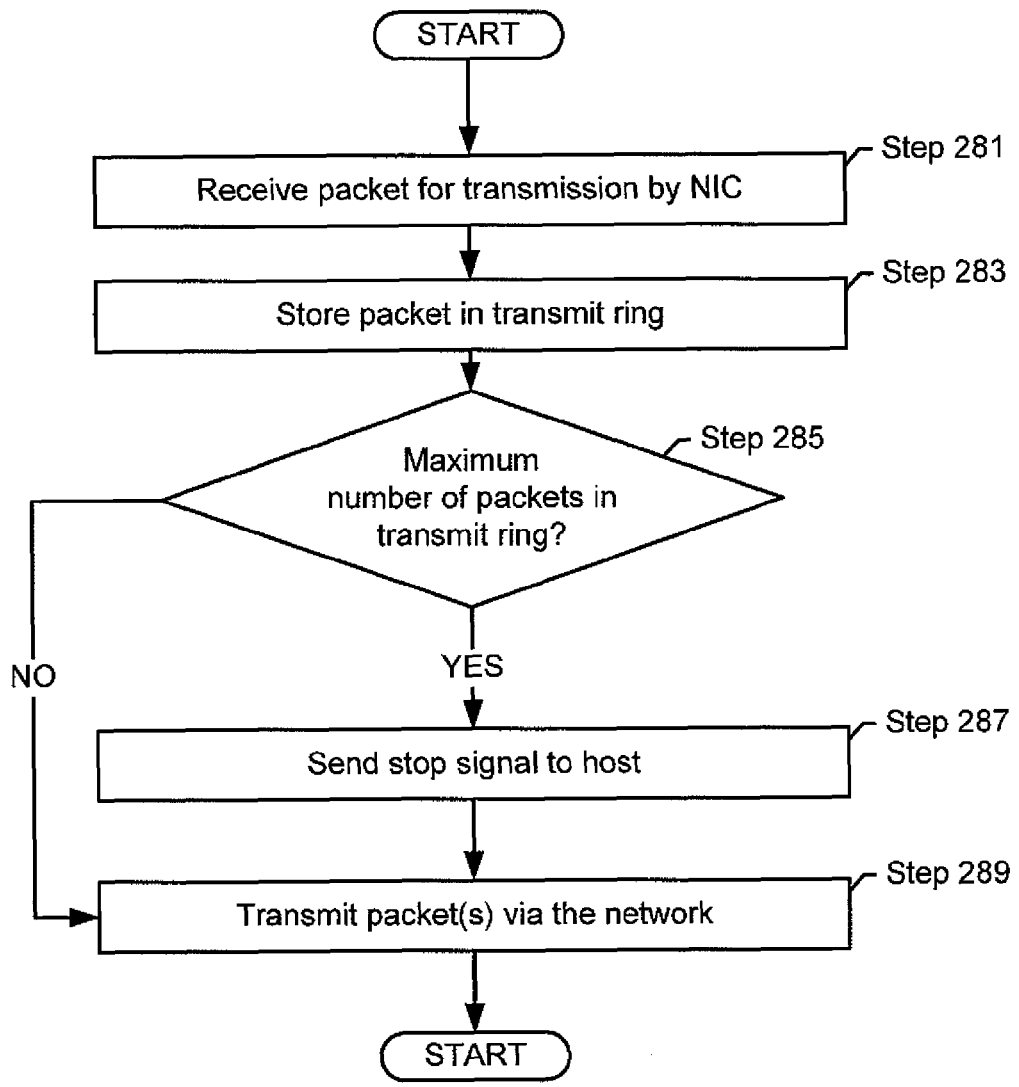
FIG. 9 shows a flowchart for bandwidth control for transmitting packets in accordance with one or more embodiments of the invention.

FIG. 9 shows a flowchart for bandwidth control for transmitting packets in accordance with one or more embodiments of the invention. Specifically, FIG. 9 shows a flowchart of a method for bandwidth control based on the size of the transmit ring. A packet for transmission is first processed by the host. The host may process packets for transmission (i.e., transmit packets from a packet origin or a non-global container to the NIC) in a manner similar to the one described above for receiving the packet. For example, when a packet is issued from a non-global container or a packet destination in the global container, the packet is issued with a target ID. The target ID is then used to obtain the corresponding VNS Instance ID from the Container-VNS mapping. The VNS Instance ID is then used to obtain the corresponding VNS Instance parameters from the VNS database. The issued packet is then processed by the Transport layer and the network layer in accordance with the VNS Instance parameters. Once the aforementioned processing is complete, the packet is sent to the NIC.

Accordingly, the NIC receives the packet for transmission (Step 281). Upon receipt of the packet, the NIC stores the packet in the transmit ring associated with the VNS instance sending the packet (Step 283). A determination is made whether the maximum number of packets are in the transmit ring (Step 285). If the maximum number of packets are in the transmit ring, then a stop signal is sent to the host (Step 287). The maximum number may be when the transmit ring is full or when a threshold number of packets are in the transmit ring. The threshold number may allow for the stop signal to propagate to the non-global container or packet origin in the global container.

While packets are received, packets may be transmitted via the network (Step 289). For example, the outbound rate regulation engine may obtain all packets in each transmit ring in a round robin. Once the packets are transmitted from the transmit ring and/or space is available in the transmit ring to store packets, then a resume signal may be sent to the host (not shown). When the resume signal is received, the host may continue sending packets to the NIC for the transmit ring.

Figure 10:
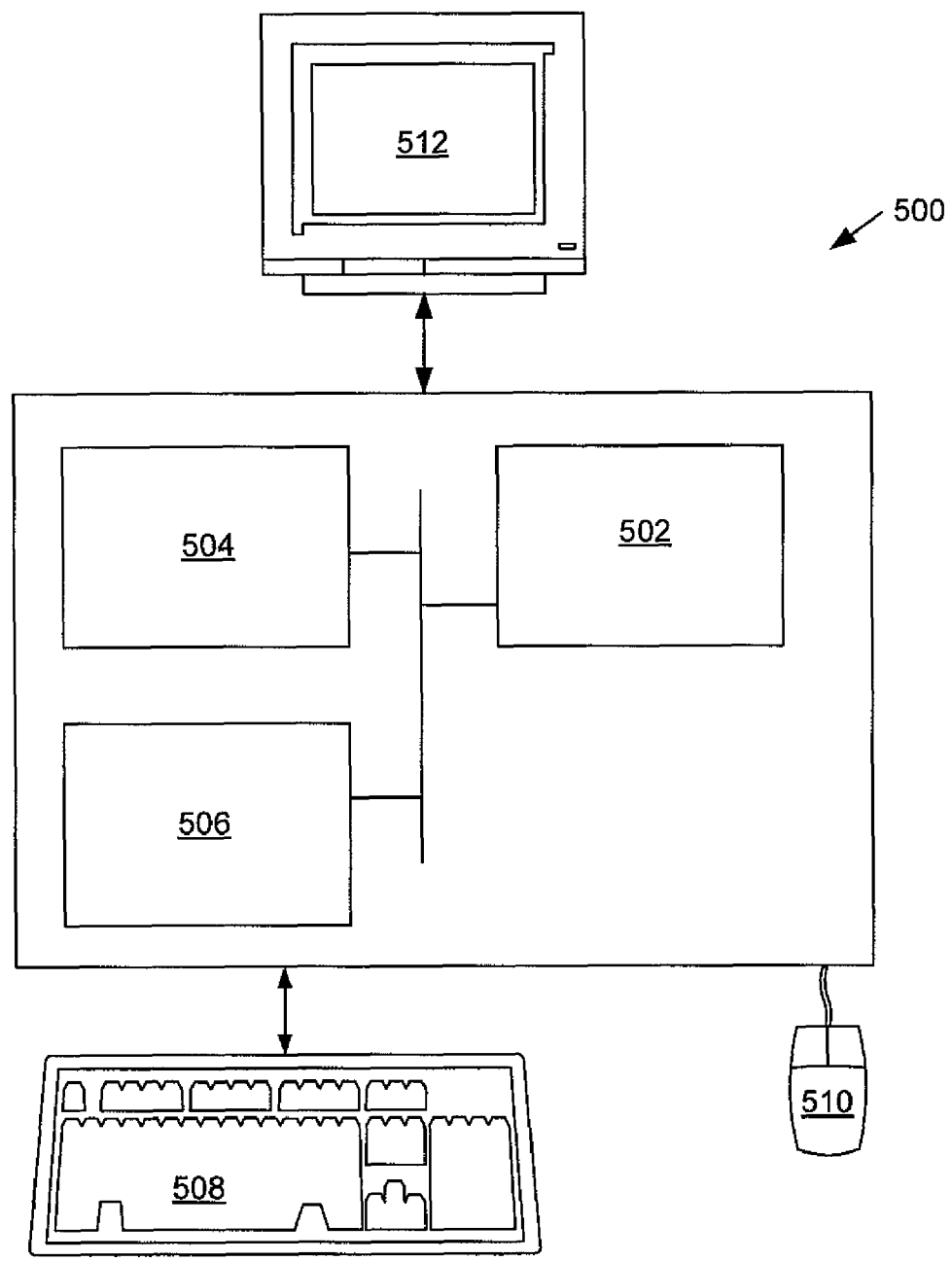
FIG. 10 shows a computer system in accordance with one or more embodiments of the invention.

The host with the NIC may be virtually any type of computer regardless of the platform being used. For example, as shown in FIG. 10, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the host and the NIC includes at least the minimal processing, input, and/or output means necessary to practice embodiments of the invention.

Embodiments of the invention allow for bandwidth control by the NIC for each specific VNS Instance. Thus, for example, bandwidth may be allocated based on one or more of a variety of factors, such as the different types of network traffic used by the container as opposed to other containers, a priority for the network traffic in the container, level of service required by the container, and other such factors. The NIC enforcement of the allocated bandwidth saves CPU resources on the host and may prevent undue processing by the host.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for bandwidth control on a network interface card (NIC), the method comprising:
 initiating a current time period;
 receiving a plurality of incoming packets;

classifying each of the plurality of incoming packets into a receive ring of a plurality of receive rings based on information in each of the plurality of incoming packets matching a container of a plurality of containers,
  wherein each of the plurality of receive rings is associated with one of the plurality of containers,
  wherein each of the plurality of containers is an isolated execution environment, and
  wherein each of the plurality of containers execute within a single instance of an operating system executing on a host;
populating, by a NIC, the receive ring with the plurality of incoming packets according to a size of the receive ring during the current time period, wherein the size of the receive ring is based on an allocated bandwidth for the container associated with the receive ring; and
sending, by the NIC, the plurality of incoming packets to the host when a duration of the current time period elapses, wherein the duration is based on the allocated bandwidth for the container associated with the receive ring.

2. The method of claim 1, further comprising:
receiving a bandwidth parameter from the host for the receive ring, wherein the bandwidth parameter identifies the allocated bandwidth for the receive ring; and
setting, by the NIC, the size of the receive ring and the duration based on the bandwidth parameter.

3. The method of claim 1, further comprising:
sending, by the NIC, a threshold number of the plurality of incoming packets to the host after the threshold number of the plurality of incoming packets is received.

4. The method of claim 3, further comprising:
receiving a bandwidth parameter from the host for the receive ring, wherein the bandwidth parameter defines a preset number of interrupts allocated to the receive ring; and
determining whether the preset number of interrupts is exceeded in the current time period, and wherein the threshold number of the plurality of incoming packets are only sent when the preset number of interrupts is not exceeded.

5. The method of claim 4, wherein the size of the receive ring is dependent on the preset number of interrupts and the allocated bandwidth.

6. The method of claim 1, further comprising:
receiving, from the host, an outbound packet;
storing the outbound packet in a transmit ring within the NIC; and
determining whether the transmit ring is currently storing a maximum number of outbound packets;
sending a stop signal to the host when the transmit ring is determined to store the maximum number of outbound packets; and
transmitting the outbound packet via a network when the transmit ring is determined not to store the maximum number of outbound packets.

7. The method of claim 6, further comprising:
determining whether transmit ring is able to receive additional outbound packets after sending the stop signal; and
sending a resume signal to the host when the transmit ring is determined to be able to receive additional outbound packets.

8. The method of claim 1, wherein setting the size of the receive ring comprises specifying a preset number of descriptors for the receive ring.

9. A network interface card, comprising:
a plurality of receive rings wherein each of the plurality of receive rings is associated with one of a plurality of containers located on a host connected to the network interface card,
  wherein each of the plurality of containers is an isolated execution environment, and
  wherein each of the plurality of containers execute within a single instance of an operating system executing on the host;
a hardware classifier configured to:
  classify the plurality of incoming packets into a receive ring of the plurality of receive rings based on information in each of the plurality of incoming packets matching a container of the plurality of containers; and
a receive regulation engine associated with the receive ring and configured to:
  initiate a current time period;
  receive a plurality of incoming packets for the receive ring from the hardware classifier;
  populate the receive ring with the plurality of incoming packets according to a size of the receive ring during the current time period, wherein the size of the receive ring is based on an allocated bandwidth for the container associated with the receive ring; and
  send the plurality of incoming packets to the host when a duration of the current time period elapses, wherein the duration is based on the allocated bandwidth for the container associated with the receive ring.

10. The network interface card of claim 9, wherein the rate regulation engine is further configured to:
receive a bandwidth parameter from the host for the receive ring, wherein the bandwidth parameter identifies the allocated bandwidth for the receive ring; and
set the size of the receive ring and the duration based on the bandwidth parameter.

11. The network interface card of claim 9, wherein the rate regulation engine is further configured to:
send a threshold number of the plurality of incoming packets to the host after the threshold number of the plurality of incoming packets is received.

12. The network interface card of claim 11, wherein the rate regulation engine is further configured to:
receiving a bandwidth parameter from the host for the receive ring, wherein the bandwidth parameter defines a preset number of interrupts allocated to the receive ring; and
determine whether the preset number of interrupts is exceeded in the current time period, and wherein the threshold number of the plurality of incoming packets is only sent when the preset number of interrupts is not exceeded.

13. The network interface card of claim 12, wherein the size of the receive ring is dependent on the preset number of interrupts and the allocated bandwidth.

14. The network interface card of claim 9, further comprising:
a transmit regulation engine configured to:
  receive, from the host, an outbound packet;
  store the outbound packet in a transmit ring within the NIC; and
  determine whether the transmit ring is currently storing a maximum number of outbound packets; and
  send a stop signal to the host when the transmit ring is determined to store the maximum number of outbound packets; and outbound rate regulation engine configured to:
    transmit the outbound packet via a network when the transmit ring is determined not to store the maximum number of outbound packets.

15. The network interface card of claim 14, wherein the transmit regulation engine is further configured to:
    determine whether a transmit ring is able receive additional outbound packets after sending the stop signal; and
    send a resume signal to the host when the transmit ring is determined to be able to receive additional outbound packets.

16. The network interface card of claim 9, wherein setting the size of the receive ring is performed by specifying a preset number of descriptors for the receive ring.

* * * * *